United States Patent [19]

Suzuki

[11] 4,066,045
[45] Jan. 3, 1978

[54] INTERNAL COMBUSTION ENGINE PROVIDED WITH PRECOMBUSTION CHAMBER

[75] Inventor: Takao Suzuki, Shizuoka, Japan

[73] Assignee: Toyota Jidosha Kogyo Kabushiki Kaisha, Toyota, Japan

[21] Appl. No.: 551,023

[22] Filed: Feb. 19, 1975

[30] Foreign Application Priority Data

Aug. 8, 1974   Japan .................... 49-90996

[51] Int. Cl.² ............................................. F02B 19/00
[52] U.S. Cl. .................... 123/30 D; 123/326; 123/32 SP; 123/191 S
[58] Field of Search ............... 123/32 ST, 32 SP, 30D 123/32 C, 32 K, 33 D, 191 S, 191 SP

[56] References Cited

U.S. PATENT DOCUMENTS

| 1,877,737 | 9/1937 | Goldberg | 123/33 D |
|---|---|---|---|
| 2,758,576 | 8/1956 | Schlamann | 123/32 ST |
| 2,878,299 | 3/1959 | Starr | 123/32 SP |
| 2,893,360 | 7/1959 | Muller | 123/32 SP |
| 3,063,434 | 11/1962 | Haas | 123/32 SP |
| 3,105,470 | 10/1963 | Hockel et al. | 123/32 SP |
| 3,140,697 | 7/1964 | Peras | 123/32 SP |
| 3,154,058 | 10/1964 | Warren | 123/32 SP |
| 3,270,722 | 9/1966 | Bernard | 123/32 ST |
| 3,592,172 | 7/1971 | Treiber | 123/32 SP |
| 3,738,333 | 6/1973 | Vogelsang | 123/32 SP |
| 3,776,212 | 12/1973 | Karlowitz | 123/32 SP |
| 3,890,742 | 6/1975 | Date et al. | 123/32 SP |
| 3,916,840 | 11/1975 | Geiger | 123/32 ST |

FOREIGN PATENT DOCUMENTS 226,862  12/1924  United Kingdom ............. 123/32 K Primary Examiner—Charles J. Myhre
Assistant Examiner—David D. Reynolds
Attorney, Agent, or Firm—Stevens, Davis, Miller & Mosher

[57] ABSTRACT

An internal combustion engine provided with a precombustion chamber which utilizes a stratified charge type combustion process and is of a spark ignition type. This engine includes a main combustion chamber confined between the head of a piston, which is reciprocably fitted in a cylinder and one end wall of said cylinder a precombustion chamber defined in the head of said cylinder above said main combustion chamber and provided with an ignition plug and a fuel injection nozzle, a transer passage communicating said main combustion chamber with said precombustion chamber and an air intake port communicated through an air intake valve with said main combustion chamber. This precombustion chamber has an oval-shape in every section taken along a longitudinal axis thereof and incorporates many considerations such as the direction and cross sectional area of the transfer passage and the volume of the precombustion chamber as well as the direction of the fuel injection nozzle, thereby reducing the amount of NOx contained in exhaust gases from the engine.

1 Claim, 2 Drawing Figures

INTERNAL COMBUSTION ENGINE PROVIDED WITH PRECOMBUSTION CHAMBER

BACKGROUND OF THE INVENTION

1. Field of the Invention

This invention relates to an internal combustion engine provided with a precombustion chamber, and more particularly to the engine having a precombustion chamber and of a gasoline injection type for use in a motor vehicle, which engine is designed to improve fuel consumption and purification of exhaust gases.

2. Description of the Prior Art

According to the prior art, in the engine having the precombustion chamber provided separately from the main combustion chamber, there is produced a rich mixture gas condition in the precombustion chamber by injecting fuel into the precombustion chamber and there is produced a lean mixture gas condition in the main combustion chamber by blowing apart of the mixture gas supplied to the precombustion chamber into the main combustion chamber, whereby a stratification of the mixture gas and two stage combustion are performed. In this case, the production of NOx of detrimental components contained in exhaust gases may be suppressed. However, because of combustion of the rich mixture in the precombustion chamber, an unfavorable amount of hydrocarbons and carbon monoxide is produced.

In usual internal combustion engines, to which the present invention is applied, the combustion chamber is divided into a main combustion chamber and a precombustion chamber, while the intake and exhaust of gases are controlled by means of intake and exhaust valves provided in the main combustion chamber. The main combustion chamber is communicated through a communicating passage with the precombustion chamber. The precombustion chamber is provided with an ignition plug and a fuel injection nozzle, whereby the rich mixture is charged and ignited in the precombustion chamber and then the flame thus produced is introduced into the main combustion chamber for the ensuing combustion of the lean mixture gas therein. In this respect, it is important that air should be supplied through the communicating passage into the precombustion chamber from the main combustion chamber without being adversely affected by the throttling action due to the communicating passage and that the flame should be uniformly diffused throughout the main combustion chamber to effect the secondary or ensuing combustion therein. In addition, the velocity of swirl flow of the mixture charge within the precombustion chamber should be damped to thereby lower the pressure increasing rate for the removal of the detrimental components contained in exhaust gases as well as the reduction in the level of noise incident to the combustion.

SUMMARY OF THE INVENTION

It is accordingly a principal object of the present invention to provide an internal combustion engine which affords improvements in the purification of harmful gas components such as NOx, HC, CO contained exhaust gases and fuel consumption, by eliminating problems experienced with the prior art internal combustion engine of this type.

It is a further object of the present invention to provide an internal combustion engine provided withe a precombustion chamber, in which air is introduced from a main combustion chamber into the precombustion chamber without being materially affected by the throttling by means of a communicating passage.

It is a still further object of the present invention to provide an internal combustion engine provided with a precombustion chamber, which may dampen the velocity of turbulent flow within a combustion chamber to some extent to thereby lower the increasing rate of pressure, thus eliminating detrimental or harmful components contained in exhaust gases and suppressing combustion noise.

According to the present invention, there is provided a precombustion chamber for use with an internal combustion engine which comprises: a main combustion chamber confined between the head of a piston, which is reciprocably disposed in a cylinder, and a wall of said cylinder; a precombustion chamber defined in the head of said cylinder above said main combustion chamber and provided with an ignition plug and a fuel injection nozzle; and a passage communicating said main combustion chamber with said precombustion chamber; said precombustion chamber being oval-shaped in contour.

DESCRIPTION OF THE PREFERRED EMBODIMENTS

Figure 1:
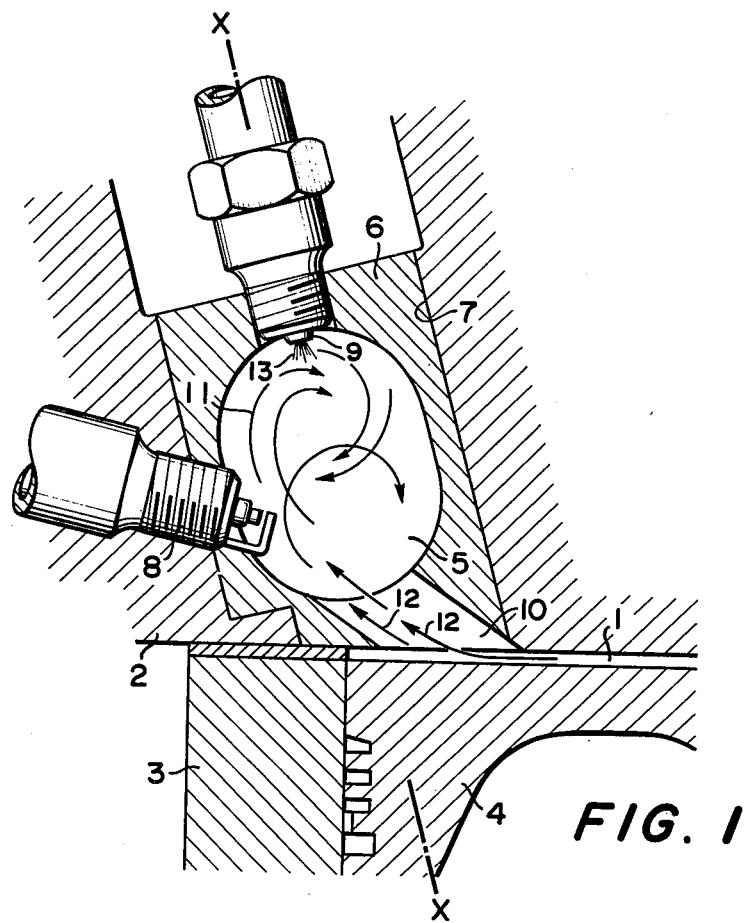
FIG. 1 is a cross-sectional view of the essential part of an engine according to the present invention.

Referring to FIG. 1, a main combustion chamber 1 is confined between a cylinder head 2 of a cylinder 3 and the head of a piston 4. For clarity, only one cylinder of a four-cycle engine construction is illustrated. The cylinder head 2 is rigidly secured to the cylinder 3 by means of conventional means, such as bolts and the like in usual manner. The piston 4 is disposed to reciprocate vertically in a cylinder bore of the cylinder 3 and is connected to an engine crankshaft (not shown) by any suitable means. Provided in the cylinder head 2 is an air intake port (not shown) adapted to be opened or closed by means of an air intake valve (not shown) as in a conventional construction. A precombustion chamber 5 is formed in the cylinder head 2 and above the main combustion chamber 1. According to the present invention, the precombustion chamber 5 has the oval-shape in every section taken along a longitudinal axis X—X thereof. The precombustion chamber 5 is formed in a block 6 which is tightly fitted in a bore 7 of the cylinder head 2. As shown, an ignition plug 8 and a fuel injection nozzle 9 are provided for the precombustion chamber 5. The ignition plug 8 and the fuel injection nozzle 9 are of conventional types which are well known in the technical field of internal combustion engines. Shown at 10 is a passage communicating the main combustion chamber 1 with the precombustion chamber 5.

Meanwhile, the volume of the precombustion chamber should be as large as possible. However, considering a space between the cylinder head 2 and the top face of the piston 4 in addition to the volume of the passage 10, the maximum volume of the precombustion chamber should be limited to about 90% of that of the whole combustion chamber including the main combustion and the precombustion chambers. The shape of the precombustion chamber is of an oval-shape configuration or contour in its cross section for developing a swirl flow 11, when an air flow 12 is introduced into the precombustion chamber. The passage 10 is formed preferably at an angle to the axis X—X so as to direct the air introduced from the main combustion chamber 1 in a tangential direction to the inner surface of the precombustion chamber 5, as shown in FIG. 1, to develop the satisfactory swirl flow 11 within the precombustion chamber. Further, the passage 10 is formed in the direction inclined to the upper surface of the piston head in order to prevent strongly impinging thereon due to the injection flow of the combustion flame from the precombustion chamber 5. In the FIG. 1, the passage 10 extends to the main combustion chamber 1 at an acute angle to the axis of cylinder bore in the cylinder 3. The cross-sectional area of the passage 10 should be 1 to 10% of that of the cylinder, thereby minimizing the loss of flow velocity due to throttling or due to a reduced cross sectional area, as well as preventing a tendency for fuel 13 injected into the precombustion chamber to be blown into the main combustion chamber directly. The direction of the transfer passage 10 should be inclined to a degree that the burnt gases within the precombustion chamber will not strongly impinge on the top face of the piston 4 and that the burnt gases will spread in a satisfactory manner throughout the main combustion chamber therein. Still furthermore, the ignition plug 8 should be located in such a position that will not adversely affect the swirl flow 11 produced within the precombustion chamber. The desirable position of the ignition plug 8 is that as shown in FIG. 1.

In the embodiment as shown, since the cross sectional configuration of the precombustion chamber is formed to an oval-shape in every section taken along a longitudinal axis X—X thereof, there are produced several circular swirl flows 11 having centers in different positions within the precombustion chamber. This oval-shape causes interference between those several swirl flows, so that the swirl flows are controlled by themselves. As a result of this control, the swirl flow speed within the precombustion chamber will be decelerated and hence the rich mixture charge is burnt gradually, so that the pressure rise rate will be lowered. This reduces the amount of NOx contained in exhaust gases and the level of noise produced.

Figure 2:
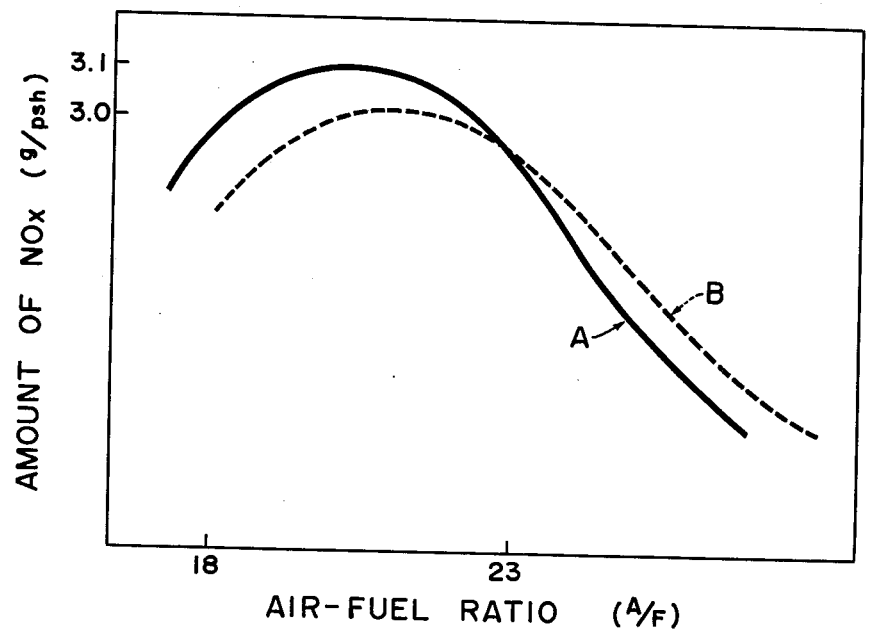
FIG. 2 is a graph plotting the relationship between the overall fuel-air ratio and the amount of NOx in connection with the precombustion chambers of a spherical shape and of an oval-shaped cross section according to the present invention.

FIG. 2 shows the relationship between the overall fuel air ratio and the amount of NOx for the both cases of a spherical precombustion chamber (curve A) and an oval-shaped precombustion chamber (curve B). As can be seen from this diagram, the precombustion chamber having the oval-shape configuration presents much reduced amount of NOx in terms of the overall fuel air ratio of no more than 23.

What is claimed is:
1. An internal combustion engine comprising:
a cylinder;
a cylinder head;
a piston reciprocably disposed in said cylinder;
a main combustion chamber defined by said piston, said cylinder, and said cylinder head;
a precombustion chamber in said cylinder head, said precombustion chamber having a longitudinal axis;
an ignition plug in said precombustion chamber;
a fuel injection nozzle in said precombustion chamber;
means defining a passage communicating said main combustion chamber and said precombustion chamber, one end of said passage opening into said main combustion chamber and the other end thereof opening directly into one end of said precombustion chamber in a direction directly toward said ignition plug, said passage having a cross-sectional area of 1 to 10% of that of said cylinder;
said fuel injection nozzle is positioned adjacent the other end of said precombustion chamber;
said ignition plug is positioned between said passage and said fuel injection nozzle; and
means for producing a plurality of substantially circular swirl flows of air, the centers of which are spaced from each other along the longitudinal axis, in the precombustion chamber and for reducing the velocity of the flows in the precombustion chamber, said means comprising:
said precombustion chamber having its longitudinal axis inclined relative to the axis of the cylinder and being oval in longitudinal cross-section; and
said passage being substantially tangentially disposed relative to the inner surface of the precombustion chamber and being inclined relative to the axis of said cylinder whereby the swirl flows produced in the precombustion chamber interfere with each other as a result of their spaced centers to decrease the velocity of the swirl flows so that flame propagation of a fuel mixture charge is lowered and the amount of $NO_x$ in exhaust gas is reduced.

* * * * *